United States Patent [19]

Seiler

[11] 4,229,026
[45] Oct. 21, 1980

[54] SOCKET CONNECTION FOR PIPES AND PIPE ELEMENTS

[75] Inventor: Georg Seiler, Munich, Fed. Rep. of Germany

[73] Assignee: Eisenwerke Friedr. Wilh. Duker GmbH & Co., Fed. Rep. of Germany

[21] Appl. No.: 17,565

[22] Filed: Mar. 5, 1979

[30] Foreign Application Priority Data

Mar. 3, 1978 [DE] Fed. Rep. of Germany ....... 2829307

[51] Int. Cl.² ............................................ F16L 21/08
[52] U.S. Cl. ............................... 285/105; 277/207 A; 285/231
[58] Field of Search ............... 285/105, 231, 345, 230, 285/104; 277/207 A

[56] References Cited

U.S. PATENT DOCUMENTS

| | | | |
|---|---|---|---|
| 2,953,398 | 9/1960 | Haugen et al. | 285/231 X |
| 3,384,392 | 5/1968 | Gilchrist | 285/105 |
| 3,724,880 | 4/1973 | Seiler | 285/105 |
| 3,963,298 | 6/1976 | Seiler | 285/231 X |

FOREIGN PATENT DOCUMENTS

| | | | |
|---|---|---|---|
| 2235391 | 1/1974 | Fed. Rep. of Germany | 285/231 |
| 2606643 | 8/1977 | Fed. Rep. of Germany | 285/105 |
| 2628727 | 1/1978 | Fed. Rep. of Germany | 285/105 |

Primary Examiner—Thomas F. Callaghan
Attorney, Agent, or Firm—Whittemore, Hulbert & Belknap

[57] ABSTRACT

The invention relates to a connector for joining pipes, particularly of metal, which comprises a socket and a pipe having a smooth end for insertion into the socket. A seal and friction ring inside the socket seals the pipe into the socket and prevents accidental withdrawal. In the present invention retaining elements are embedded in the elastomeric sealing material of which the ring is composed and are axially slidably guided as well as being freely tiltable about an annular bead on the socket.

8 Claims, 6 Drawing Figures

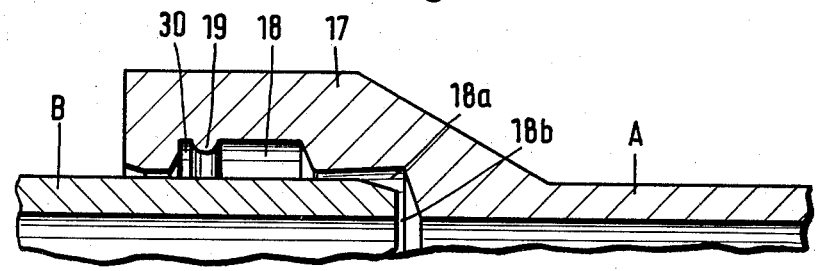
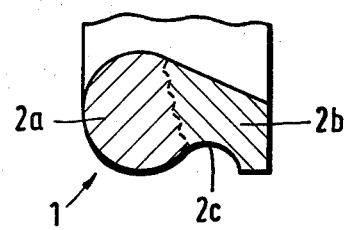
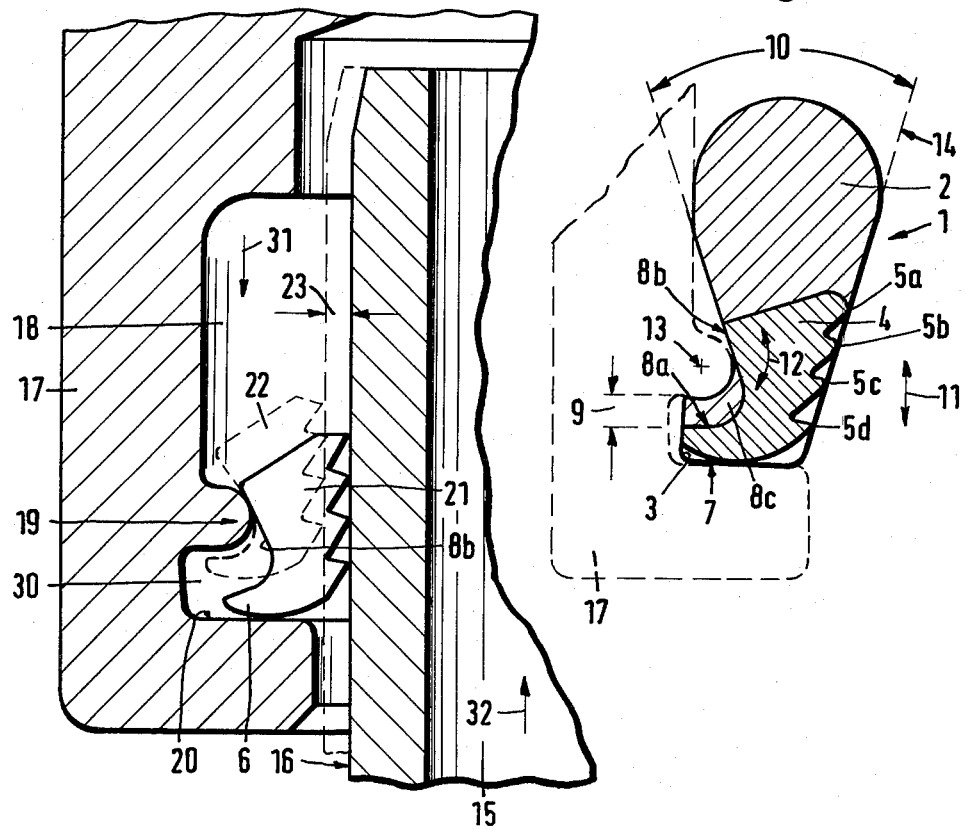

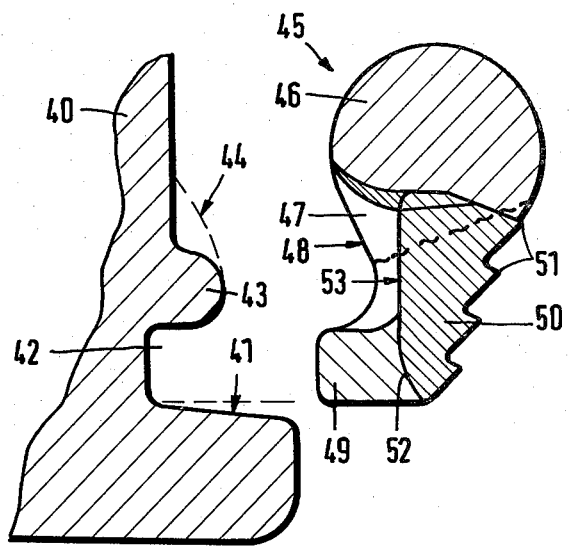
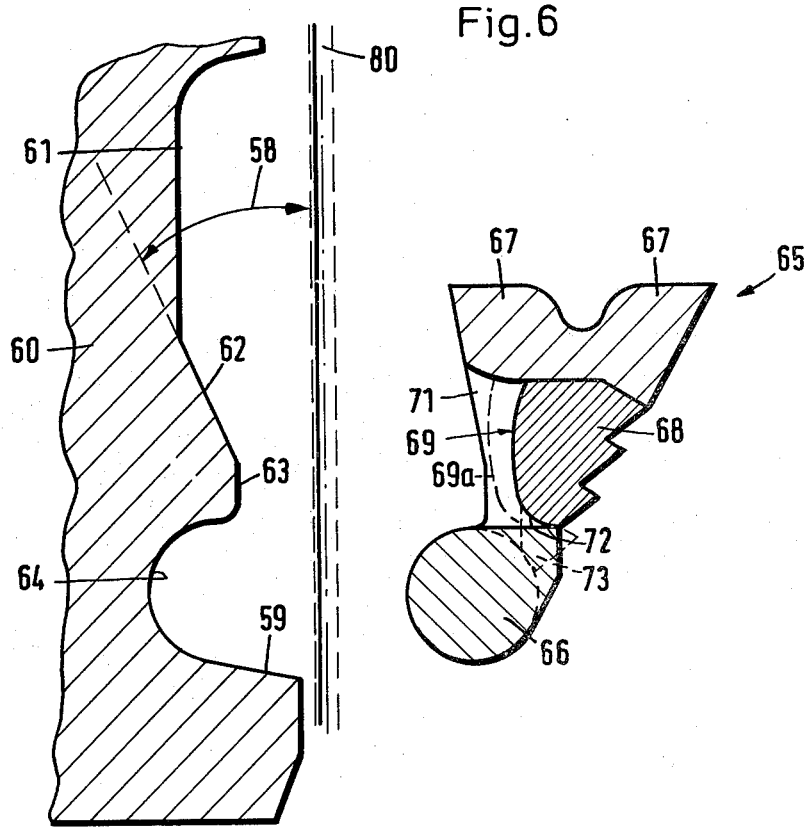

SOCKET CONNECTION FOR PIPES AND PIPE ELEMENTS

The invention relates to a socket connection for pipes and pipe elements, more particularly of metal.

Socket connections of this kind for metal pipes with one smooth insertion end and one socket end accommodating the latter with radial clearance are known (see German Patent Specification No. 2 226 151). In the known socket connection the serrated internal edges of each retaining element are constructed so that, in dependence on the permissible diameter tolerance of the insertion end, they have different axial and radial portions in terms of the tilting axis of the retaining element. Each retaining element is substantially movable only about its tilting axis. The arrangement is such that only one serrated internal edge or one group of serrated internal edges engages with the circumference of the insertion end in each tilted position and substantially identical and optimum engagement conditions occur in each tilted position as regards the transmission of forces. Accordingly, the known socket connection therefore provides reliable engagement conditions over a specific tolerance range with respect to the diameter of the insertion end or the internal diameter of the socket end, which said conditions ensure that shear forces and tensile forces are reliably absorbed by the socket connection without the sealing action being impaired. This socket connection has therefore proved itself to be very reliable in practice.

However, it has been found problematical, at least under certain conditions, that only a limited part of the available serrated internal edges engage with the circumference of the insertion end in each angular position of the retaining elements. This results in force concentrations along linear engagement regions. The consequence of these could be high notching effects which in some cases could also lead to damage or destruction of the insertion end, more particularly if the socket connection is subjected to alternating forces.

It is an object of the invention to mitigate these disadvantages and to provide a socket connector so that, while ensuring reliable action to counteract sliding, the forces required are distributed over zones of the insertion end which are extended over a greater surface, while at the same time an even greater tolerance range as regards diametral deviations of the components can be safely and reliably controlled with one and the same combined seal and anti-slide ring.

The present invention provides a connector for connecting pipes, which comprises a pipe having a smooth insertion end, a socket adapted to receive the pipe with radial clearance, and a seal and friction ring; the socket having in its interior a substantially radially extending end shoulder and axially spaced therefrom an annular bead so as to form a annular groove; a base portion of the ring being disposed between the shoulder and the bead and a sealing portion of the ring being situated on a side of the annular bead which is distal from the base portion, the sealing portion having embedded therein a plurality of retaining elements which are distributed in the circumferential direction and each of which has at least two serrated internal edges for acting on the circumference of the smooth insertion end and which are tiltably supported on the annular bead, the radially outwardly oriented circumferential surface of each retaining element diverging towards the sealing portion to define a divergence angle with respect to an envelope surface that contacts all internal edges of the retaining element, and the circumferential surface being constructed as a sliding surface; each retaining element embedded in the sealing material being axially slidably guided on the annular bead, by means of the sliding surface and being freely tiltably supported in every axial position.

By virtue of this construction each retaining element is not only able to tilt freely, individually and independently of the other retaining elements, but it can also slide freely in the axial direction. This means more particularly that independently of its position and independently of the existing diameter toperances of the pipe portions to be connected each retaining element in its operative state assumes a position in which practically all serrated internal edges of the retaining element act simultaneously and substantially with the same loading on the circumference of the insertion end. Irrespective of irregularities of the surface on the insertion end identical engagement conditions and uniform distribution of the radial clamping forces are therefore obtained over larger surface regions of the insertion end circumference. Undesirable high notching effects cannot occur in any case. Nevertheless, substantial diameter tolerance ranges can be reliably controlled with one and the same combined seal and anti-slide ring. The simultaneous axial action of the retaining element embedded in the combined seal and anti-slide ring produces the action of a wedge which is axially displaced by the applied forces until it transmits the maximum possible clamping force on the circumference of the insertion end while being simultaneously tilted to provide adaptation to the characteristics and nature of the surface of the insertion end.

Such wedging actions are known in order to prevent sliding action (see German Patent Specification No. 2 034 325). However, this deals with different conditions because the anti-sliding action and sealing action in this known case are separated from each other and two separate elements must therefore be installed into each pipe connection.

By contrast, the present socket connector has a construction in which one combined seal and anti-slide ring is inserted as a structural unit in which the retaining elements are fixedly installed into the unit. This means that they are captively adhesively joined, vulcanized or connected in some other manner to the seal ring. It does not mean that the retaining elements form a rigid unit together with the combined seal and anti-slide ring. Instead, the ring in its entirety is deformable to facilitate insertion into the socket. Furthermore, retaining elements are slidable as well as axially tiltable with respect to the elastomer parts of the ring. The elastomer part is locked against axial displacement by means of a base portion which engages with a groove.

If the retaining elements have a radially outwardly oriented extension which engages with the internal groove of the socket the latter will have smaller dimensions in the direction of the socket axis with respect to the internal groove. The axial sliding motion of the retaining element is therefore restricted to a predefined amount in both axial directions. However, advantageously the system is arranged without a radial extension so that the radial movability of the retaining element is restricted in only one axial direction namely by the end shoulder of the socket.

Insertion of the smooth pipe end deforms the seal ring over the sealing portion thereof. The retaining elements are simultaneously aligned with the envelope surface of the serrated internal edges with the axis of the smooth pipe end. When the smooth pipe end is inserted they can slide axially away from the end shoulder to increase the clear distance between oppositely disposed retaining elements until the smooth pipe end can be pushed inwardly, accompanied by sliding friction. The serrated internal edges of the retaining elements will already bear freely on the circumferential surface of the insertion end. As soon as the desired installation state is achieved the restoring force in the elastomer part of the seal ring will provide a specific prestress by means of which the retaining elements are prestressed in the direction towards the end shoulder of the socket. The said prestress maintains the retaining elements in contact both with the socket and with the insertion end. The prestress therefore acts in the form of a slight clamping force on the insertion end. As soon as the applied forces increase due to an increase of the pressure in the interior of the pipeline the axial sliding force acting on the retaining elements will also increase and these retaining elements are driven in wedge configuration in the gap between the contact surface of the socket and the circumferential surface of the insertion end in the axial direction towards the end shoulder so that the radial clamping force acting on the insertion end is correspondingly increased. Transmission of the forces over the internal edge of the retaining elements is optimized because the retaining elements can pivot and at the same time can adapt themselves reliably to the characteristics of the circumferential surface of the insertion end.

If the front end of a retaining element abuts against the end shoulder, a deflecting radius, integrally formed on the front end of the retaining element will ensure that the said end of the retaining element is inwardly deflected in the radial direction and is thrust against the circumference of the insertion end. The retaining element is in contact with the socket by means of two contact lines situated at an opposite axial distance from each other but this does not in any way impair the operation of the anti-slide means.

The co-operating surfaces of the retaining element and the socket are advantageously constructed so as to result in only slight frictional forces. To this end at least one of the two surfaces is constructed in convex or barrel configuration with respect to the direction towards the other surface.

In some cases it has also been found advantageous if the outwardly oriented sliding surface of the retaining element is radially slightly set back relative to the corresponding external envelope surface of the elastomer ring, but is at least exposed, i.e. is not covered by the elastomer material. This facilitates the insertion and precise alignment of the retaining elements while reducing the amount of force which has to be applied. In cases in which good electrical contact is to be established by means of the pipe connection this feature ensures improved metallic contact between the retaining element and the socket. Furthermore the friction forces due to relative movement are reduced, an effect which is assisted if at least one of the co-operating surfaces is covered with a wear-resistant and electrically insulating stratum. This may be desired in some cases, for example if an electrically conductive connection between pipe portions joined by the pipe connection is to be reliably prevented.

The conventional shape of the socket end need not be altered for the novel embodiment, irrespective of whether the sealing portion of the seal ring is of droplet shape, for example as in the seal known under the name "TYTON" or if it is constructed as a double lip. It can however also be particularly convenient if the annular bead side which is distal from the end shoulder forms a sloping contact surface which forms an acute angle, more particularly between 20° and 30°, with the socket axis.

Several embodiments of the invention will now be explained by reference to diagrammatic drawings in which:

FIG. 1 shows a part and a longitudinal section of a typical socket connection without seal and anti-slide ring.

FIG. 2 shows a cross-section of the contour of a well known seal ring, traded under the name "TYTON-DICHTUNG", FIG. 3 shows to a scale greater than that of FIGS. 1 and 2 an embodiment of the novel socket connection, FIG. 3 showing a cross-section through the antislide ring used seal ring.

FIG. 4 is a similar view showing the socket connection and the operation of the retaining elements used in the ring according to FIG. 3. The elastomer part of the ring is not shown in FIG. 4 in the interests of simplicity.

FIG. 5 shows a modified embodiment in a view similar to that shown in FIG. 3, and FIG. 6 shows a view similar to that of FIG. 5 of another embodiment of the novel socket connection.

The socket connection shown in FIG. 1 is intended to connect the pipe portion A to the pipe portion B. The pipe portion A is provided with a socket 17 and the pipe portion B has a smooth end.

FIG. 1 shows both parts in the installed state. In this state the socket 17 surrounds the smooth pipe end with a radial clearance and the magnitude of the clearance varies in the axial direction. Close to the open end of the socket there is provided an annular groove 30 which is defined between an end shoulder and an annular bead 19. On the far side of the annular bead 19 there is provided a seal chamber 18 of substantial width. This serves to receive the seal portion of a combined seal and anti-slide ring. The seal chamber 18 adjoins a transition chamber 18a which is provided in an axial gap 18b between the annular base of the socket and the end face of the insertion end. The arrangement is such that the two pipe elements A and B in the installed state thereof are able to perform relative pivoting motions or are able to accommodate alignment errors of their axes without the parts touching each other.

A seal ring, whose contour is shown in FIG. 2, is preferably and normally used for the type of socket shown in FIG. 1. The seal ring 1 has a barrelled seal portion 2a of softer rubber and an adjoining base portion 2b of relatively hard rubber the outside of which is provided with an annular groove 2c to accommodate the annular bead 19.

According to FIGS. 3 and 4 a plurality of retaining elements 4 are fixedly embedded at distances from each other in the circumferential direction of the elastomer seal ring 1, i.e. they are adhesively joined or vulcanized. The retaining elements 4 have a limited partially annular circumferential extent. On its radial inner side each of the retaining elements 4 is provided with a plurality of serrated engagement edges 5a, 5b, 5c and 5d, the edges of which in the illustrated example are situated on a common frustoconical envelope surface 14. Each retaining element 4 is defined on its radial exterior by a circumferential surface which is also situated on a frustoconical envelope surface 8b. The envelope surface 14 and the circumferential surface 8b diverge in the axial direction from the end shoulder 20. The divergence angle is designated with the numeral 10 and conveniently covers the range between approximately 25° and approximately 45°, preferably it amounts to approximately 30°.

It can be seen that the retaining elements 4 are embedded substantially in the base portion 2b of the seal ring, i.e. in the hard rubber part. The serrated internal edges are exposed towards the inside. In the region of the converging end in the example according to FIGS. 3 and 4, each retaining element 4 has a radially outwardly projecting extension 6 which engages between the end shoulder 20 and the annular bead 19, as shown in FIGS. 3 and 4, when installed in the annular groove 30. The axial extent of the extension 6 is small compared with the axial width of the annular groove 30. On the limiting side a of the extension 6, nearest to the annular groove 19, the extension can be provided with a soft rubber cover 8c which applies a prestress on being deformed, said prestress tending to thrust the retaining element 4 downwardly as in FIG. 3. It can be seen that by virtue of the free sliding space designated with the numeral 9 in FIG. 3 and by virtue of the external surface 8b of the retaining element 4 bearing upon the annular bead 19, the said retaining element can axially slide to a limited extent in the direction of the double arrow 11 in FIG. 3 and is simultaneously able to pivot freely about the annular bead 19, which is curved in circular configuration about the axis 13, in accordance with the double arrow 12.

So that pivoting is also made possible in the limiting position shown in FIG. 3, the end face of the retaining element nearest to the end shoulder 20 is constructed in convex or barrel form as indicated at 7 in FIG. 3.

FIG. 4 shows the arrangement in the installed state, namely for different diameters of the insertion end 15. The combined seal and anti-slide ring according to FIG. 3 assumes the position indicated in FIG. 3 after insertion into the socket shown in broken lines in FIG. 3. On insertion of the smooth pipe end 15 in the direction of the arrow 32 the circumferential surface 16 of the pipe end comes into contact with the serrated internal edges of the retaining element 4 and with the elastomer material. The retaining elements 4 are axially displaced in the insertion direction and are simultaneously pivoted until the internal edges bear uniformly on the circumference of the insertion end. Sliding of the seal ring in its entirety is prevented by engagement of the base portion 2b (see FIG. 2) with the annular groove 30. The numeral 21 indicates in solid line the limiting position of the retaining element if the insertion end 15 has a very small diameter while the numeral 22 shows in broken lines the position of the retaining element if the insertion end 15 has a large diameter. The numeral 23 refers to the diameter tolerance range which can be reliably controlled with one and the same combined seal and anti-slide ring.

If as a result of internal pressure in the pipeline hydraulic or some other pressure is applied to the soft rubber portion 2 after installation, as indicated by the arrow 31 (FIG. 4), each retaining element 4 will be axially displaced with substantial force in the direction towards the shoulder by means of the soft rubber associated with the seal ring (FIG. 2), item 2a) and is thus pressed between the circumferential surface 16 of the insertion end 15 and the annular bead 19 in wedge configuration. These forces act via internal edges of the retaining elements 4 in the form of radial clamping forces on the circumference of the insertion end and secure the insertion end reliably against any axial sliding force. The forces are distributed over substantial regions of the circumference.

In the embodiment according to FIG. 5 it is assumed that the socket 40 is constructed substantially similar to the socket according to FIG. 1. The end shoulder is designated with the numeral 41, the annular groove with the numeral 42, the annular bead with the numeral 43. It is also assumed that the elastomer seal ring 45 is constructed in a manner similar to that shown in FIG. 2. The soft rubber portion is designated with the numeral 46 and the base portion of harder rubber is designated with the numeral 49. A plurality of retaining elements 50, each having four inwardly oriented serrated internal edges 51 and a substantially frustoconical external surface 53 are fixedy embedded in the elastomer ring. The retaining elements 5 do not have any extension which engages in the groove 42. Instead, the narrower axial end 52 is provided with a deflection curvature which, on striking the end shoulder 41, ensures that the narrow end of the retaining element is pressed radially inwardly against the circumference of the insertion end. It can be seen that the external surface 53 of the retaining element can be radially inwardly offset with respect to the external circumference 48. This region of the retaining element can also be free of any elastomer. The surface 53 can therefore be exposed on the outside of the seal ring by means of a kind of window 47. The important feature is merely direct contact of the surface 53 and the bead 43 of the socket without clamping of the elastomer.

The slidability of the retaining element 50 in the axial direction in this embodiment is restricted in only one direction, namely in the direction towards the end shoulder 41 and by the said end shoulder.

Conveniently, the side of the annular bead 43 associated with the socket and distal from the end shoulder 41, is defined by a sloping surface, as indicated at 44, which forms an acute angle with the socket axis, more particularly between 20° and 30°. If the external sliding surface 53 of the retaining element 50 is substantially flat, as indicated in FIG. 5, the sliding surface 44 will preferably be of barrelled construction as indicated.

A slightly modified embodiment, but corresponding to the embodiment shown in FIG. 5, is shown in FIG. 6. The annular groove 64 of the socket 60 has a semicircular contour and merges into the sloping end shoulder 59. The beads 63, defining the groove 64, can be rounded or, as illustrated can be cylindrical and is confined on the side distal from the groove 74, by a sloping surface 62 which forms an acute angle 58 with the axis of the socket. The double lip soft rubber portion 67 of the seal and antislide ring 65 is situated in the seal chamber 61, of the socket. At the bottom end the said ring has an annular bead of substantially circular contour, designated with the numeral 66 and engaging with the annular groove 64 in order to anchor the seal ring in the socket. A plurality of retaining elements 68 are vulcanized in the circumferential direction between the bead portion 66 and the soft rubber portion 67, which said retaining elements have free serrated internal edges 70 as shown in solid lines or four such internal edges as shown in broken lines at 73. The external sliding surface 69 or 69a is outwardly curved in barrelled form and is freely accessible, it being not covered at 71 by the elastomer compound, and where appropriate is slightly radially offset with respect to the external circumference of the ring (shown in greatly exaggerated form in FIGS. 5 and 6). The retaining element 68 of this embodiment are in practice freely slidable in both axial directions and can pivot freely in each axial position as is also the case in the embodiment illustrated in FIG. 5. The numeral 80 in FIG. 6 indicates the possible insertion end diameter tolerance range which can be accommodated by one and the same seal and anti-slide ring.

What we claim is:

1. A connector for connecting pipes, which comprises a pipe having a smooth insertion end, a socket adapted to receive the pipe with radial clearance, and a seal and friction ring; the socket having in its interior a substantially radially extending end shoulder and axially spaced therefrom an annular bead so as to form an annular groove; a base portion of the ring being disposed between the shoulder and the bead and a sealing portion of the ring being situated on a side of the annular bead which is distal from the base portion, the sealing portion having embedded therein a plurality of retaining elements which are distributed in the circumferential direction and each of which has at least two serrated internal edges for acting on the circumference of the smooth insertion end and which are tiltably supported on the annular bead, the radially outwardly oriented circumferential surface of each retaining element diverging towards the sealing portion to define a divergence angle with respect to an envelope surface that contacts all internal edges of the retaining element, the circumferential surface being a sliding surface for axially slidably guiding the embedded retaining element on the annular bead while maintaining the retaining element freely tiltably supported in every axial position.

2. A connector according to claim 1, wherein each retaining element is provided with a radial extension disposed within the annular groove and having axial clearance with respect to the end shoulder and bead to resist axial movement relative thereto in the annular groove, and further including a soft elastomeric covering on a surface of the extension and situated between the extension and the annular bead.

3. A connector according to claim 2, wherein the surface of the extension adjacent the end shoulder is convexly curved in radially extending sectional planes towards the end shoulder.

4. A connector according to claim 1, wherein the axial slideability out of the socket in the direction of the end shoulder of each retaining element is limited solely by the end shoulder.

5. A connector according to claim 4, wherein a sliding surface of each retaining element is provided at an end region adjacent the end shoulder with a deflecting surface which co-operates with the end shoulder.

6. A connector according to claim 1, wherein a side of the annular bead distal from the end shoulder is defined by a sloping frustoconical guiding surface which forms an acute angle with the socket axis, and co-operates with the retaining element sliding surface, at least one of said sliding and guiding surfaces being convex or barrelled towards the other respective surface.

7. A connector according to claim 1, wherein the divergence angle is in dependence on the axial extent of sliding travel of the retaining element so that the extent of radial movement of the envelope surface, tilted into a position parallel with the axis of the insertion and, is equal to or greater at both ends of the sliding travel than half a maximum permissible variation in diameter of the insertion end.

8. A connector according to claim 1 wherein each retaining element comprises at least three serrated internal edges, and the envelope line, which simultaneously touches all internal edges is a straight line.

* * * * *